United States Patent [19]

Stedman

[11] 4,100,990
[45] Jul. 18, 1978

[54] STEERING APPARATUS
[75] Inventor: Robert N. Stedman, Chillicothe, Ill.
[73] Assignee: Caterpillar Tractor Co., Peoria, Ill.
[21] Appl. No.: 791,900
[22] Filed: Apr. 28, 1977
[51] Int. Cl.² ............................................. B62D 5/10
[52] U.S. Cl. ..................................... 180/135; 180/139
[58] Field of Search ................ 180/135, 134, 139, 140

[56] References Cited
U.S. PATENT DOCUMENTS

| 3,367,437 | 2/1968 | Garrett | 180/135 |
| 3,771,241 | 5/1972 | Lindell | 180/135 |

FOREIGN PATENT DOCUMENTS

| 650,730 | 10/1962 | Canada | 180/135 |
| 1,427,194 | 3/1976 | France | 180/135 |

Primary Examiner—Joseph F. Peters, Jr.
Assistant Examiner—R. Schrecengost
Attorney, Agent, or Firm—John L. James

[57] ABSTRACT

Steering apparatus is provided for a vehicle which has first and second sections and Ackerman steering apparatus connected to the first section. The steering apparatus includes a coupling assembly, steering cylinders for moving the first section relative to the coupling assembly and a linkage mechanism for changing the orientation of the first section relative to the second section. The coupling assembly is connected to the first and second sections and pivotally movable relative to the first section. The linkage mechanism is pivotally connected to the coupling assembly and Ackerman steering apparatus. The linkage mechanism has construction sufficient for actuating the Ackerman steering apparatus in response to movement of the coupling assembly relative to the first section.

7 Claims, 2 Drawing Figures

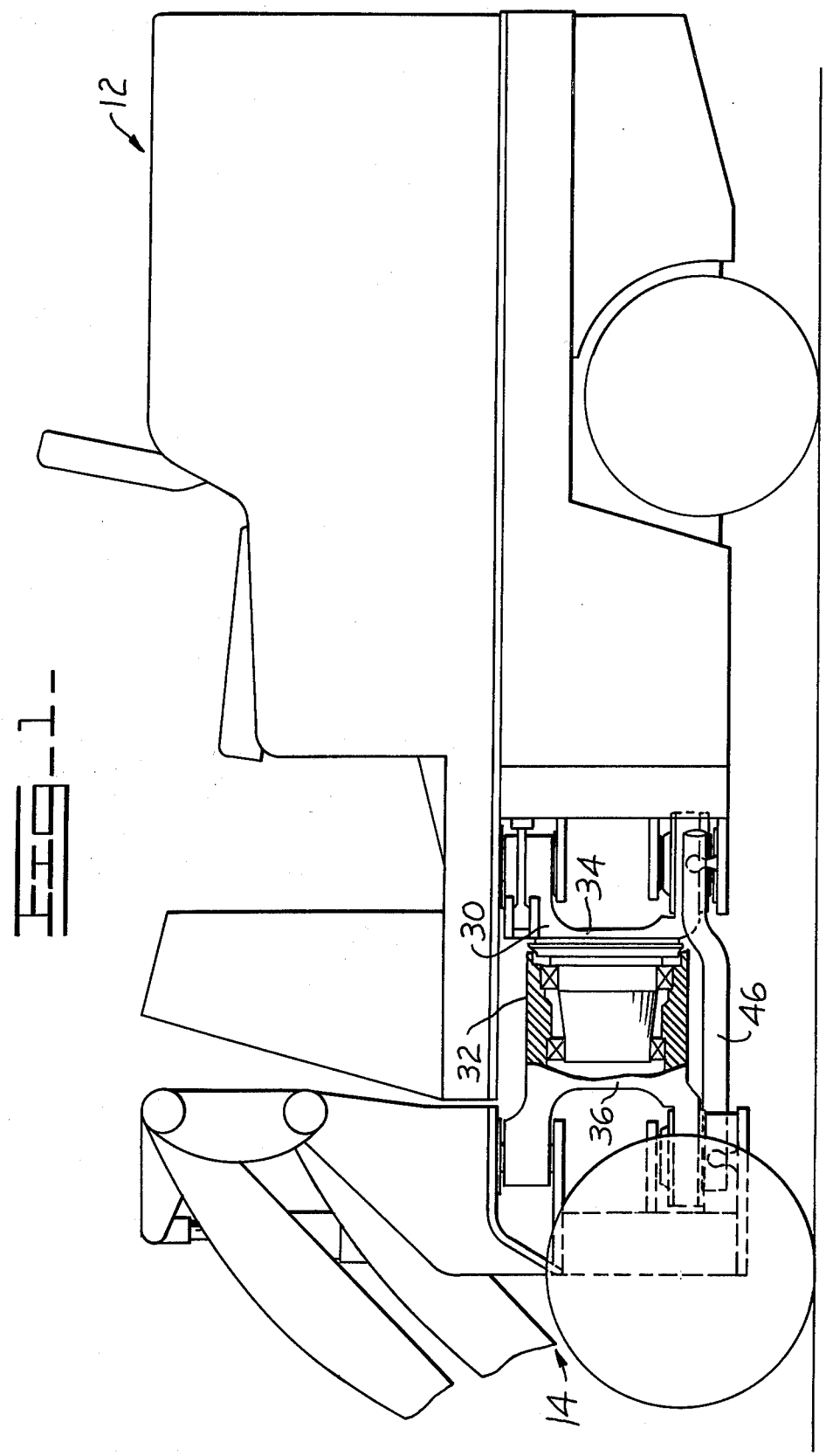

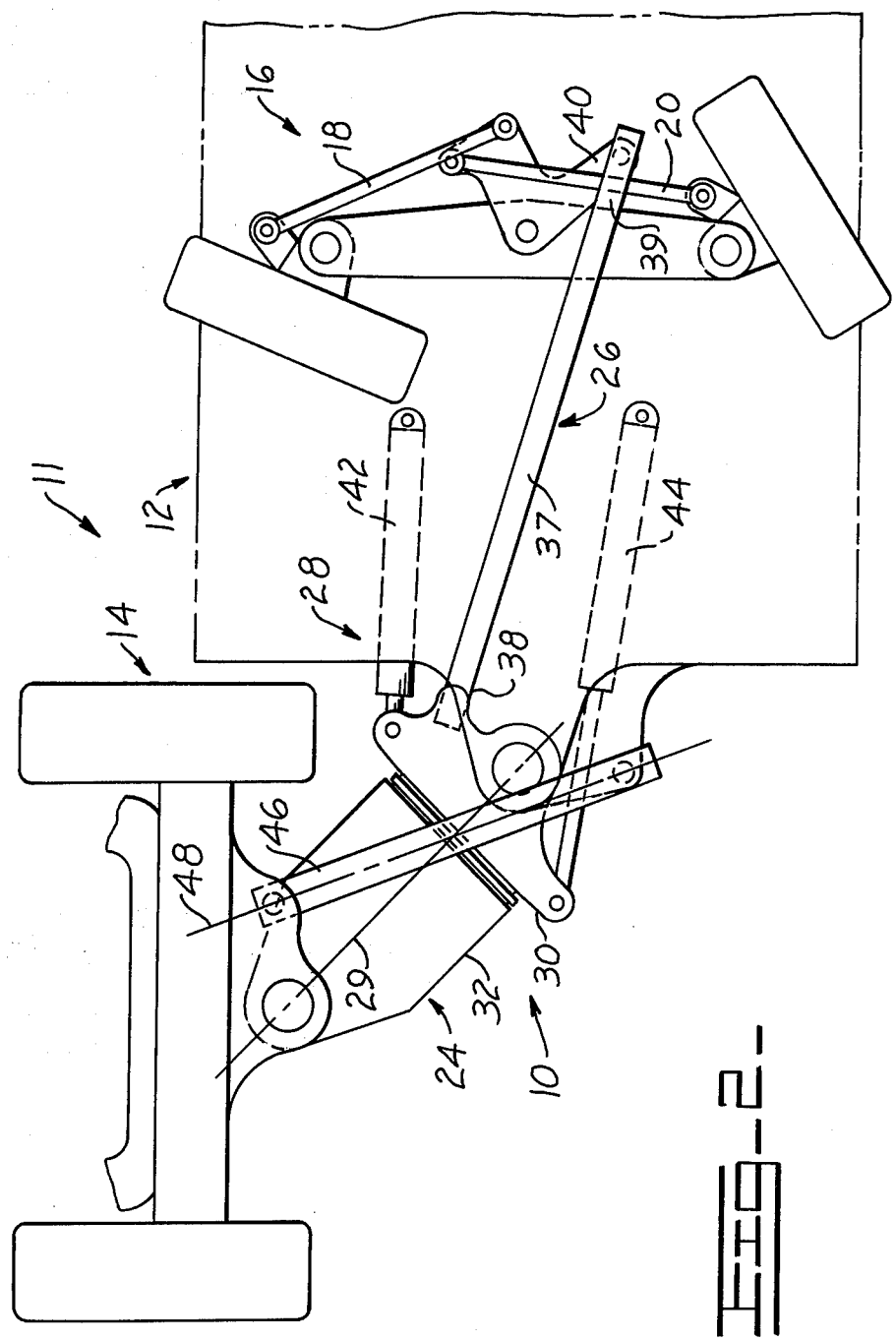

STEERING APPARATUS

BACKGROUND OF THE INVENTION

Many work vehicles, such as lift trucks, for example, operate in confined areas where maneuverability of a high magnitude is desirable. It is desirable for a lift truck to have as small a turning radius as possible. Ideally, a lift truck should be able to make a ninety degree turn. Such a sharp turn would reduce the amount of aisle space required for turns and promote greater space utilization and efficiency.

The present invention is directed to overcoming one or more of the problems as set forth above.

According to the present invention, steering apparatus is provided for a vehicle which has first and second sections and Ackerman steering apparatus connected to the first section. The steering apparatus includes a coupling assembly, linkage mechanism and means for moving the first section relative to the coupling assembly and automatically changing the lateral orientation of the first section relative to the second section. The coupling assembly is connected to the first and second section and pivotally movable relative to the first section. The linkage mechanism is pivotally connected to the coupling assembly and Ackerman steering apparatus. The linkage mechanism has a construction and arrangement sufficient for actuating the Ackerman steering apparatus in response to and as a function of movement of the coupling assembly relative to the first section.

BRIEF DESCRIPTION OF THE DRAWINGS

FIG. 1 is a diagrammatic side view of a vehicle; and
FIG. 2 is a diagrammatic bottom view of the vehicle.

DETAILED DESCRIPTION

Referring to FIGS. 1 and 2, steering apparatus 10 is provided for a vehicle 11, such as a lift truck for example, which has first and second sections 12, 14 and Ackerman steering apparatus 16 connected to the first section 12. The Ackerman apparatus includes first and second track rods 18,20.

The steering apparatus 10 includes a coupling assembly 24, linkage mechanism 26 and moving means 28 connected to the vehicle 11, Ackerman apparatus 16 and to one another.

The coupling assembly 24 has a longitudinal axis 29 and includes first and second end portions 30,32 which preferably have double trunnion ends 34,36 and which are rotatably connected one to the other. The first and second double trunnions 34,36 are pivotally connected to the respective first and second sections 12,14 of the vehicle 11. The second section 14 is pivotally movable relative to the first section 12 for at least 90° to the left and right for a total of at least 180° of lateral pivotal movement. The second section 14 is freely rotatable relative to the first section 12 about the longitudinal axis 29 of the coupling assembly 24 when the first and second sections 12,14 are aligned with the axis 29. Rotation becomes increasingly difficult as the first and second sections 12,14 become misaligned with the axis 29.

The linkage mechanism 26 is pivotally connected to the coupling assembly and Ackerman steering apparatus 16. The linkage mechanism 26 includes a link 37 with first and second end portions 38,39 and a connecting arm 40 which is pivotally connected to the first section 12 of the vehicle 11. The connecting arm 40 has a general "L" configuration with one leg of the "L" pivotally connected to the second end 39 of the link 37 and the other leg pivotally connected to each of the track rods 18,20. The first end 30 of the coupling assembly 24 is pivotally connected to the first end portion 38 of the link 37. The linkage mechanism 26 moves the track rods 18,20 in response to and as a function of pivotal movement of the coupling assembly 24 relative to the first section 12 of the vehicle 11.

The moving means 28 includes a fluid motor, preferably hydraulic cylinders 42,44, pivotally connected to the first section 12 of the vehicle and pivotally connected to the first end 30 of the coupling assembly. The hydraulic cylinders 42,44 are preferably double-acting. Solenoids (not shown) could be used instead of the hydraulic cylinders 42,44. The moving means 28 is actuated by various devices, such as steering wheels or levers (not shown), which are well known in the art. For example, where the vehicle 11 is a lift truck, the moving means 28 is preferably actuated by a steering wheel assembly.

A brace 46 has a longitudinal axis 48 and is pivotally connected to the first and second sections 12,14 of the vehicle 11. The brace 46 is positioned so that the axis 48 would intersect the axis 29 of the coupling assembly 24 if both axes 29,48 were in the same horizontal plane. The brace 46 is constructed of strong, durable material, such as steel or the like, and is at an elevation generally lower than the elevation of coupling assembly 24. The brace 46 is arranged such that a decrease in the turning radius of the vehicle 11, is accompanied by a decrease in rotation of the second section 14 relative to the first section 12 about the longitudinal axis 29 of the coupling assembly 24. The brace 46 limits rotation of the second section 14 relative to the first section 12 about the axis 29 of the coupling assembly to a preselected value.

In the operation of the steering apparatus 10, the operator manipulates the steering wheel to actuate the moving means 28. The moving means 28 cause the first section 12 to pivotally move in a preselected direction with respect to the first end 30 of the coupling assembly 24. This pivotal movement moves the link 37 which manipulates the connecting arm 40 and actuates the Ackerman steering apparatus 16. The Ackerman apparatus 16 is actuated in response to and as a function of the pivotal movement of the first section 12 with respect to the coupling assembly 24. The brace 46 and coupling assembly 24 cooperate when a turn is made. The brace 46 causes the second end 32 of the coupling assembly 24 to pivotally move with respect to the second section 14 of the vehicle 11.

Other aspects, objects and advantages will become apparent from a study of the specification, drawings and appended claims.

The embodiments of the invention in which an exclusive property or privilege is claimed are defined as follows:

1. Steering apparatus for a vehicle having first and second sections and Ackerman steering apparatus connected to said first section, comprising:
   a coupling assembly connected to said first and second sections and being laterally, pivotally movable toward and from the first section and toward and from the second section;
   means for moving said first section relative to said coupling assembly; means for automatically controllably changing the lateral orientation of said first section relative to said second section; and a linkage mechanism pivotally connected to said coupling assembly and Ackerman steering apparatus and being of a construction and arrangement sufficient for actuating said Ackerman steering apparatus in response to and as a function of the pivotal movement of said coupling assembly relative to said first section.

2. An apparatus, as set forth in claim 1, wherein the linkage mechanism includes a link having first and second end portions and a connecting arm, said first end portion being pivotally connected to said coupling assembly, said second end portion being pivotally connected to said connecting arm.

3. An apparatus, as set forth in claim 2, wherein said connecting arm is of a general "L" configuration and is pivotally connected to said first section of the vehicle and pivotally connected to said Ackerman steering apparatus.

4. An apparatus, as set forth in claim 1, wherein the coupling assembly includes:
first and second end portions rotatably connected one to the other, said first end portion being pivotally connected to said first section and said second end portion being pivotally connected to said second section, said second section being free for at least one hundred eighty degrees of lateral pivotal movement relative to said first section toward and from the first section and free for rotation generally about a longitudinal axis of the coupling assembly.

5. An apparatus, as set forth in claim 4, wherein the means for automatically controllably changing the lateral orientation of said first section relative to said second section includes a brace having a longitudinal axis and being pivotally connected to said first and second vehicle sections, the longitudinal axis of the brace crossing longitudinal axis of the coupling assembly and the brace limiting rotation of the second end portion of the coupling assembly relative to the first end portion and limiting rotation of the second vehicle portion relative to the first vehicle portion.

6. An apparatus, as set forth in claim 5, wherein the brace axis crosses the coupling assembly axis at an angle which increases as the turning radius of the vehicle decreases thereby decreasing the rotation of the first vehicle section relative to the second vehicle section.

7. Apparatus, as set forth in claim 1, wherein the moving means comprises at least one double acting fluid motor pivotally connected to said coupling assembly and said first section.

* * * * *